(12) United States Patent
Wu et al.

(10) Patent No.: US 7,632,581 B2
(45) Date of Patent: Dec. 15, 2009

(54) BATTERY BOX

(75) Inventors: Hung-Yi Wu, Taipei Hsien (TW); Ke Sun, Shenzhen (CN); Zhen-Xing Ye, Shenzhen (CN); Xiao-Zhu Chen, Shenzhen (CN)

(73) Assignees: Hong Fu Jin Precision (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 435 days.

(21) Appl. No.: 11/695,621

(22) Filed: Apr. 3, 2007

(65) Prior Publication Data

US 2008/0044723 A1    Feb. 21, 2008

(30) Foreign Application Priority Data

Aug. 18, 2006    (CN) .......................... 2006 1 0062209

(51) Int. Cl.
*H01M 2/10*    (2006.01)
*H01M 2/30*    (2006.01)

(52) U.S. Cl. .............................. 429/1; 429/96; 429/99; 429/100; 429/121

(58) Field of Classification Search ..................... 429/1, 429/96, 99, 100, 121; 439/500
See application file for complete search history.

(56) References Cited

U.S. PATENT DOCUMENTS 6,696,817 B2    2/2004    Awatsu et al.

FOREIGN PATENT DOCUMENTS

JP    59127364 A    7/1984

*Primary Examiner*—Melvin C Mayes
*Assistant Examiner*—James Corno
(74) *Attorney, Agent, or Firm*—Frank R. Niranjan

(57) ABSTRACT

A battery box includes a housing, a positive electrode member, and a negative electrode member. The housing includes a receiving space in a side thereof for receiving at least one battery therein. The receiving space defines two slots at opposite ends thereof. The positive electrode member is mounted to the housing and includes two positive electrode terminals each located at a corresponding one of the slots of the housing, respectively. The negative electrode member is mounted to the housing and includes two negative electrode terminals extending into the receiving space of the housing and each at a side of a corresponding slot of the housing.

14 Claims, 14 Drawing Sheets

BATTERY BOX

BACKGROUND OF THE INVENTION

1. Field of the Invention

The present invention relates to battery boxes, and particularly to a battery box which readily and securely installs batteries therein.

2. Description of Related Art

There are a variety of electrical devices driven by batteries, and there are a variety of battery boxes for receiving the batteries, which vary corresponding to the type of batteries used in those electrical devices.

A general battery box is disclosed in U.S. Pat. No. 6,696,817. The battery box includes a housing section with its upper portion being open, and further includes a positive electrode terminal and a negative electrode terminal arranged respectively on inner end walls of the housing section so as to oppose to each other. The positive electrode terminal is for contacting with positive electrodes of batteries, and the negative electrode terminal is for contacting with negative electrodes of batteries. When batteries are inserted into the housing section of the battery box from the opening, users need identify the positive and negative electrode terminals of the battery box, and the positive and negative electrodes of the batteries for proper installation of the batteries. The above-mentioned battery box is not convenient for use, because users sometimes may not correctly identify positive and negative electrodes of batteries, and positive and negative electrode terminals of the battery box. If batteries are installed incorrectly, damage may occur.

What is desired, therefore, is a battery box of which, users need not be mindful of the polarities of batteries inserted therein.

SUMMARY OF THE INVENTION

An exemplary battery box includes a housing, a positive electrode member, and a negative electrode member. The housing includes a receiving space in a side thereof for receiving at least one battery therein. The receiving space defines two slots at opposite ends thereof. The positive electrode member is mounted to the housing and includes two positive electrode terminals each located at a corresponding one of the slots of the housing, respectively. The negative electrode member is mounted to the housing and includes two negative electrode terminals extending into the receiving space of the housing and each at a side of a corresponding slot of the housing.

Other advantages and novel features will become more apparent from the following detailed description when taken in conjunction with the accompanying drawings, in which:

DETAILED DESCRIPTION OF THE INVENTION

Figure 1:
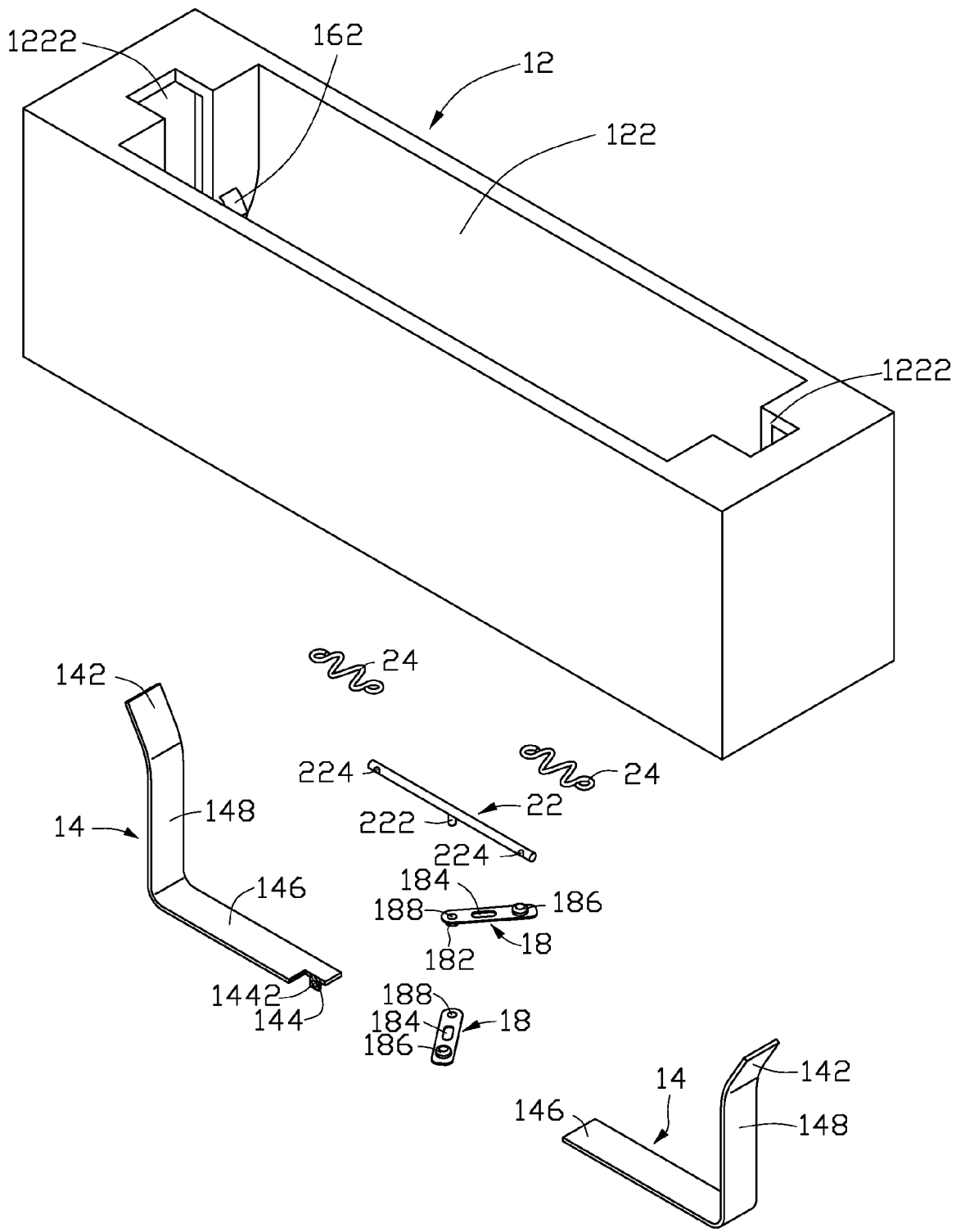
FIG. 1 is an exploded, isometric view of a battery box in accordance with a first preferred embodiment of the present invention.
Figure 2:
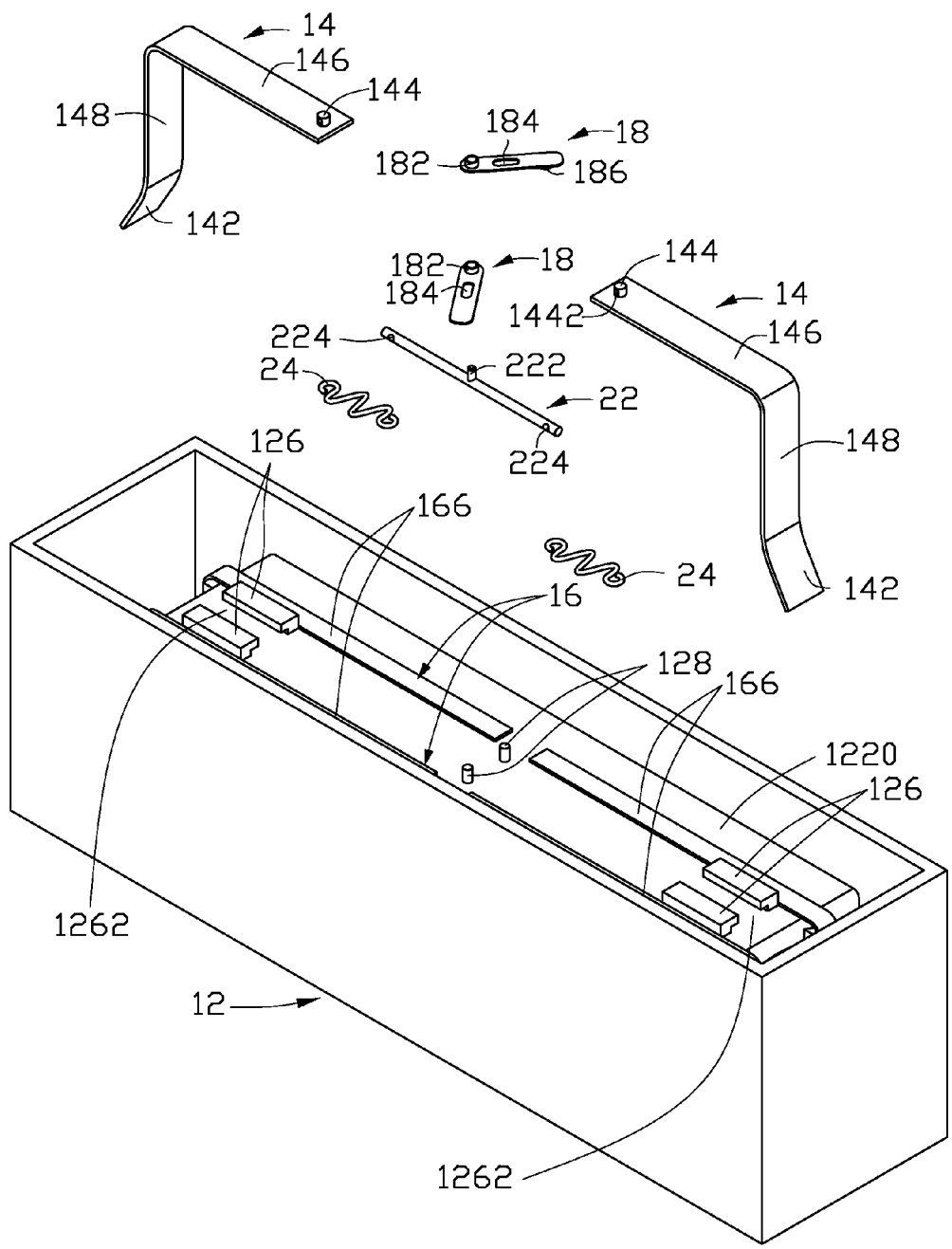
FIG. 2 is similar to FIG. 1, but an inverted view.

Referring to FIGS. 1 and 2, a battery box in accordance with a first preferred embodiment of the present invention includes a housing 12, two first positive electrode members 14, two pairs of first negative electrode members 16, two second negative electrode members 18 acting as negative electrode output member of the battery box, a second positive electrode member 22 acting as a positive electrode output member of the battery box, and two elastic snake-shaped members 24.

Figure 8:
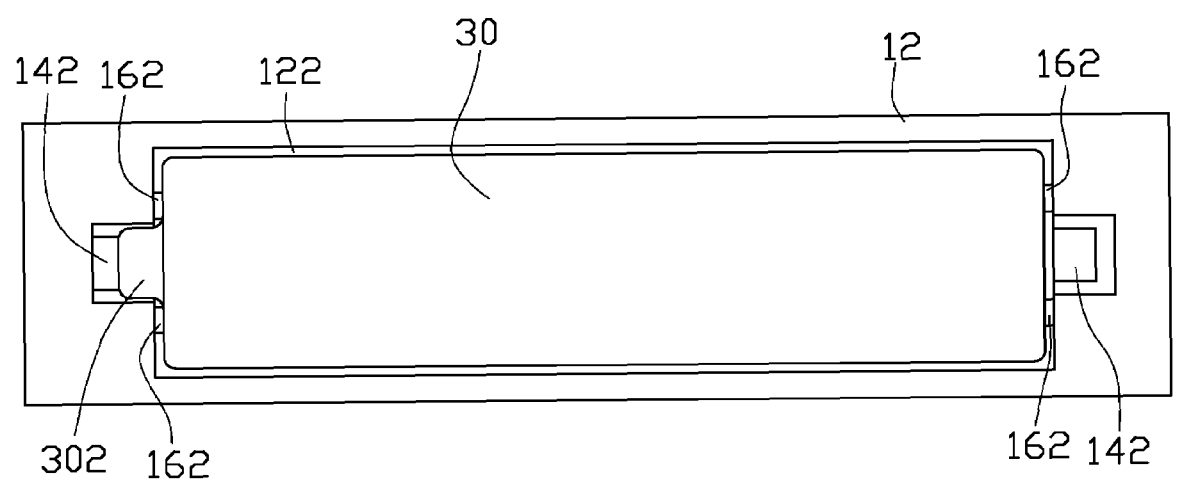
FIG. 8 is similar to FIG. 5, with a battery mounted therein.

The housing 12 defines a receiving space 122 in a side for accommodating at least a battery 30 (shown in FIG. 8). Two slots 1222 are defined in opposite ends of the housing 12 and communicating with the receiving space 122, respectively. A bottom of the receiving space 122 at an opposite side of the housing 12 forms a mounting wall 1220. Two posts 128 protrude from a middle of the mounting wall 1220. Two face-to-face L-shaped limiting portions 126 extend from each end of the mounting wall 1220. A sliding rail 1262 is formed between the two limiting portions 126.

Each first positive electrode member 14 includes a sliding portion 146, and a positive electrode terminal 148 perpendicularly extending from an end of the sliding portion 146. A slanting guiding portion 142 extends from a distal end of the positive electrode terminal 148. A hitching part 144 defining traversely a hole 1442 therein protrudes from an opposite end of the sliding portion 146 opposed to the positive electrode terminal 148.

Figure 3:
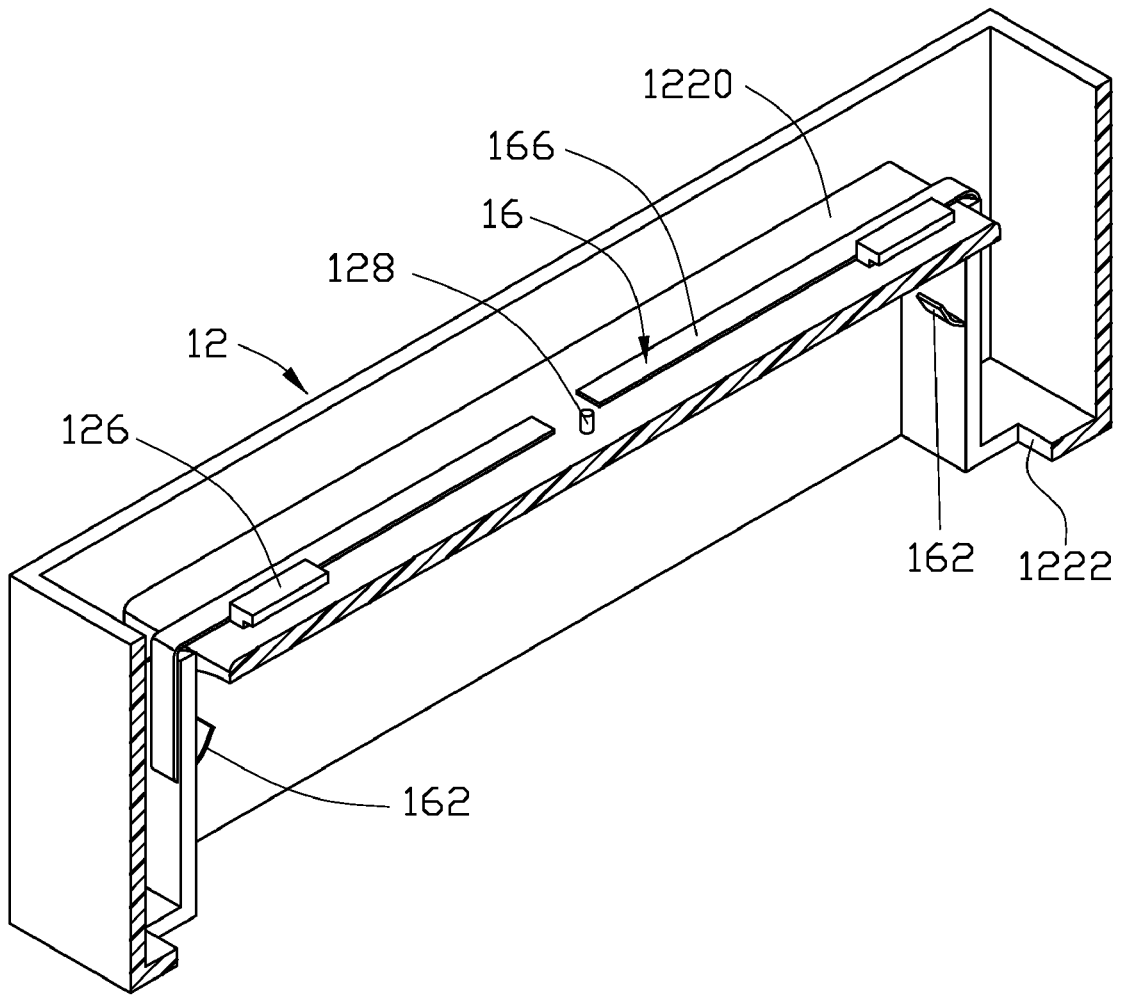
FIG. 3 is an assembled, cutaway view of a housing and a pair of negative electrode members.
Figure 4:
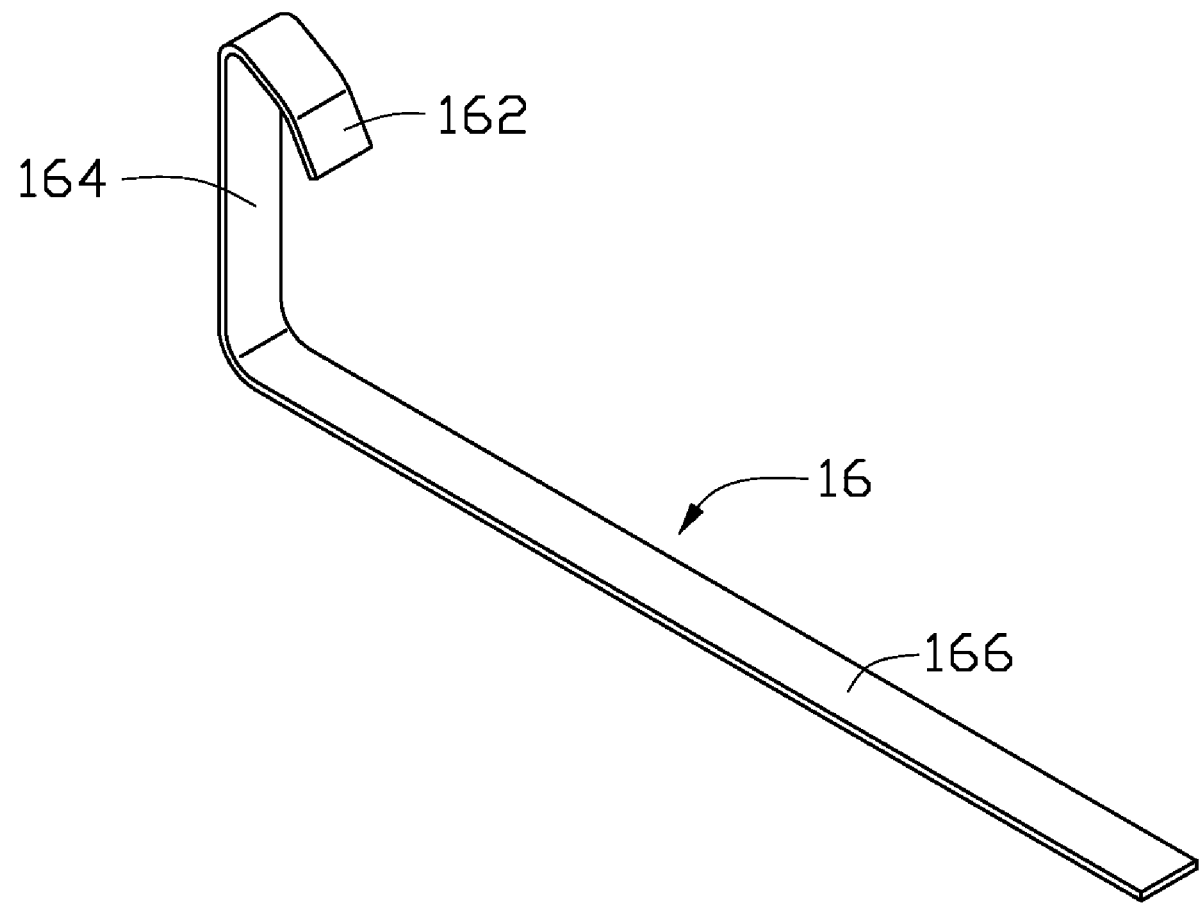
FIG. 4 is an isometric view of one of the pair of the first negative electrode members of FIG. 3, but an inverted view.

Referring also to FIGS. 3 and 4, each first negative electrode member 16 is generally L-shaped. The first negative electrode member 16 includes a mounting portion 166, a connecting portion 164 perpendicularly extending from an end of the mounting portion 166, and a negative electrode terminal 162 slantingly extending from a distal end of the connecting portion 164 toward the mounting portion 166.

Referring to FIGS. 1 and 2 again, each second negative electrode member 18 defines a restricting slot 184 in a middle thereof. A projecting portion 186 protrudes from an end of the second negative electrode member 18. A shaft hole 188 is defined in an opposite end of the second negative electrode member 18. A ring portion 182 protrudes from the opposite end of the second negative electrode member 18 in a direction opposing to the direction in which the projecting portion 186 extends. The ring portion 182 surrounds the shaft hole 188 and acts as a negative electrode of the battery box.

The second positive electrode member 22 is pole-shaped. A through hole 224 is defined in each end of the second positive electrode member 22. A shaft 222 protrudes from a middle of the second positive electrode member 22. The second positive electrode member 22 together with the shaft 222 has an insulative layer wrapping a circumference thereof. A free end of the shaft 222 acts as a positive electrode of the battery box.

Figure 5:
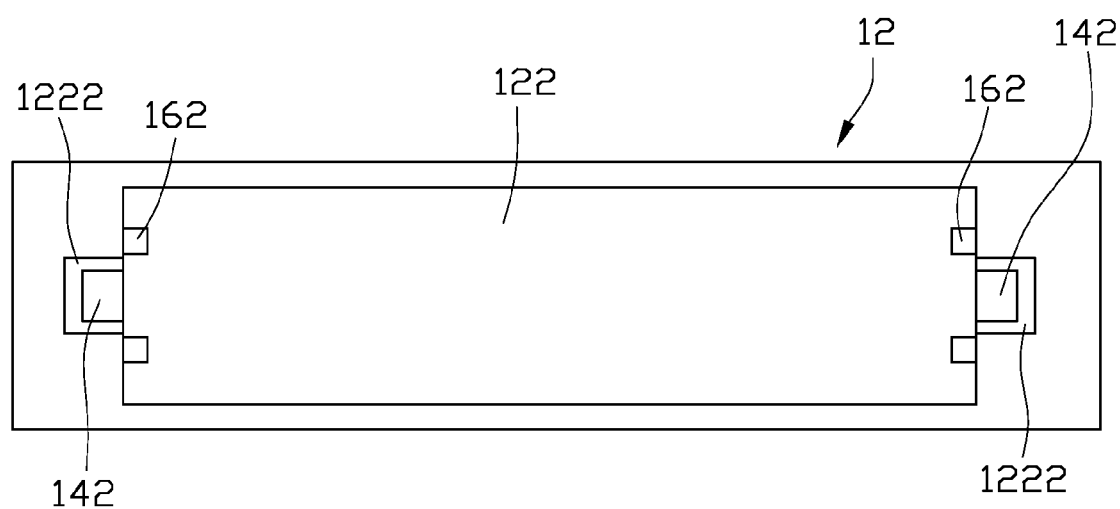
FIG. 5 is an assembled, top view of FIG. 1.
Figure 6:
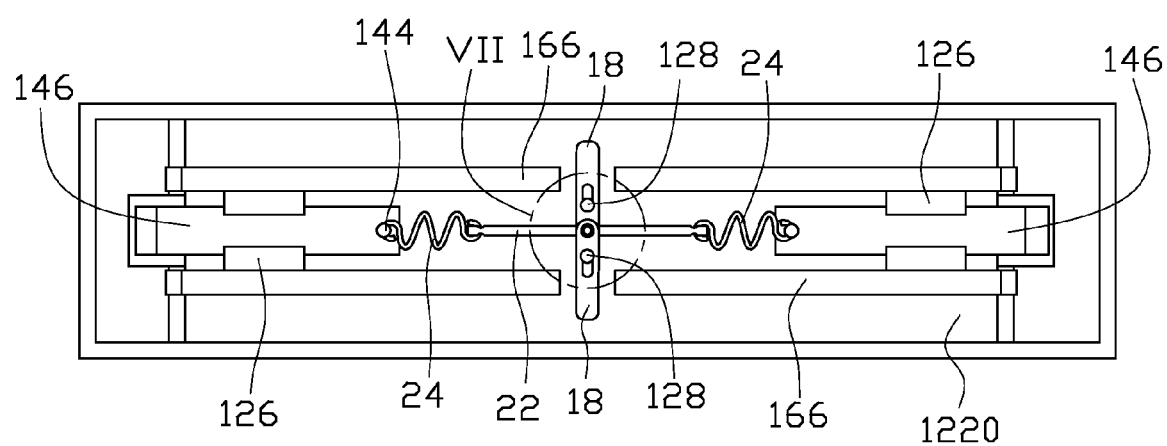
FIG. 6 is an assembled, bottom view of FIG. 1.
Figure 7:
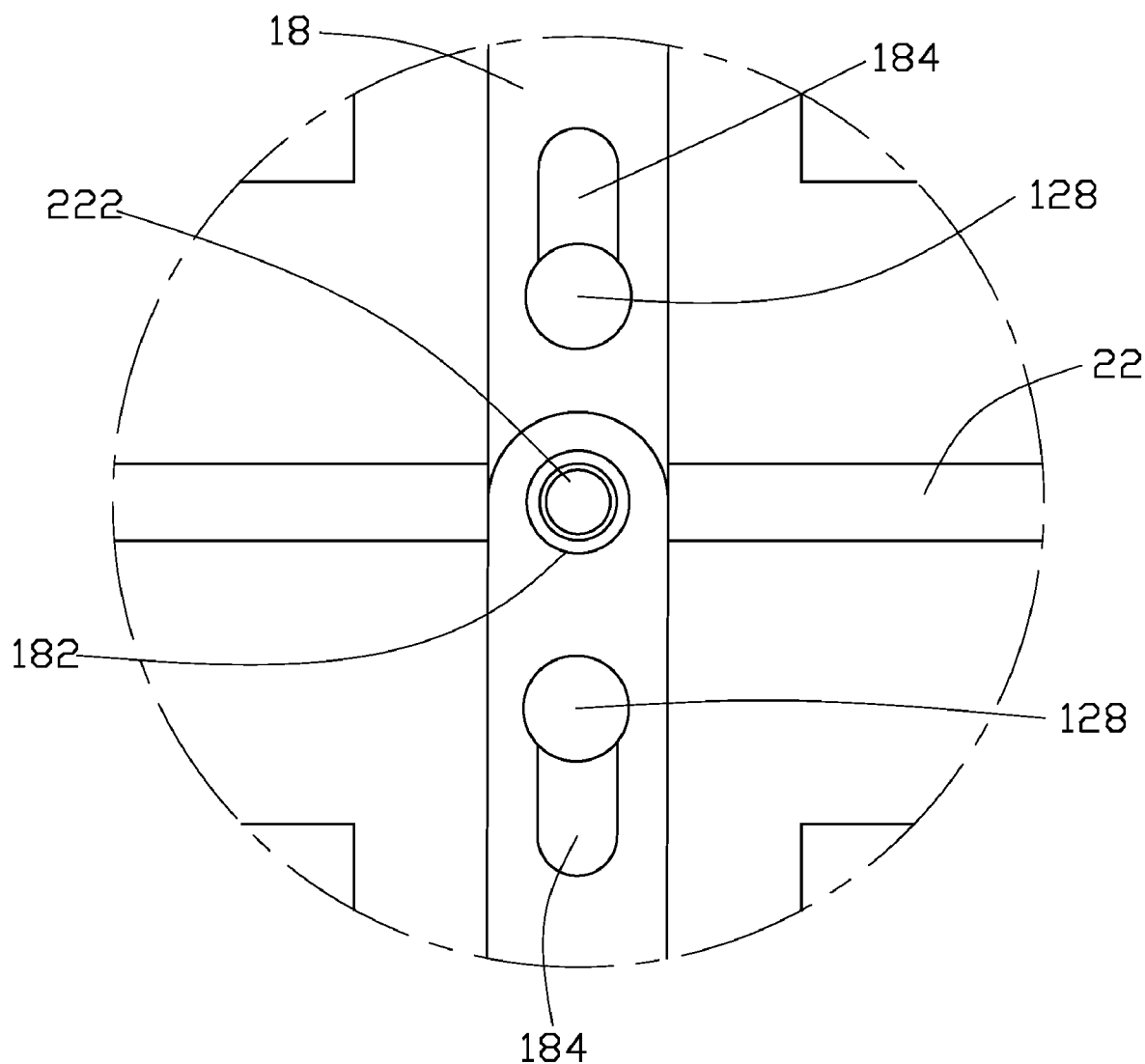
FIG. 7 is an enlarged view of a circled portion of FIG. 6.

Referring also to FIGS. 5 to 7, in assembly, the mounting portion 166 of each first negative electrode member 16 is mounted to the mounting wall 1220 of the housing 12 and at a side of a corresponding limiting portion 126. The connecting portion 164 of the first negative electrode member 16 is attached to an outer surface of an end wall of the receiving space 122. The negative electrode terminal 162 of the first negative electrode member 16 pierces through the end wall to extend into the receiving space 122, and is located at a side of a corresponding slot 1222. The sliding portion 146 of each first positive electrode member 14 is slidably received in a corresponding sliding rail 1262. The positive electrode terminal 148 of the first positive electrode member 14 is located in a corresponding slot 1222. One end of each elastic member 24 is engaged in the hole 1442 of the hitching part 144 of a corresponding first positive electrode member 14, and electrically connected with the first positive electrode member 14. The other end of the elastic member 24 is engaged in a corresponding through hole 224 of the second positive electrode member 22, and electrically connected with the second positive electrode member 22. The two elastic members 24 and the second positive electrode member 22 together form an elastic returning structure. The second negative electrode members 18 are pivotably mounted to the second positive electrode member 22 via the shaft holes 188 receiving the shaft 222. The restricting slot 184 of each second negative electrode member 18 receives a corresponding post 128 of the housing 12. A top of each post 128 is hot melted to prevent the corresponding second negative electrode member 18 from disengaging from the post 128. The post 128 is slidable in the restricting slot 184.

Figure 9:
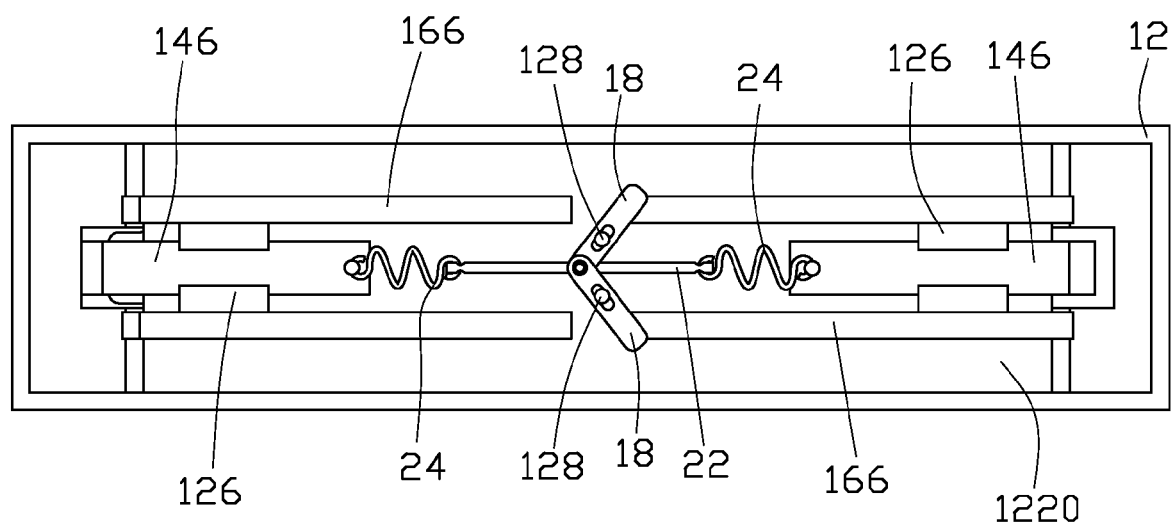
FIG. 9 is similar to FIG. 8, but an inverted view.

Referring also to FIGS. 8 and 9, in use, the battery 30 is placed into the receiving space 122 of the housing 12, and two corresponding negative electrode terminals 162 at a corresponding end of the receiving space 122 press against the negative electrode of the battery 30. The positive electrode of the battery 30 slides down along the guiding portion 142 at an opposite end of the receiving space 122, of the corresponding first positive electrode member 14, and drives the first positive electrode member 14 to move. The first positive electrode member 14 drives the second positive electrode member 22 to move together toward the corresponding end of the mounting wall 1220 via the corresponding elastic member 24. The second positive electrode member 22 drives the second negative electrode members 18 to move toward the end of the mounting wall 1220. However, the corresponding posts 128 restrict the second negative electrode members 18 to a pivot motion when they move toward the end of the mounting wall 1220, until the projecting portions 186 of the second negative electrode members 18 touch the mounting portions 166 of the corresponding first negative electrode members 16 mounted at an opposite end of the mounting wall 1220. When the battery 30 is removed, the elastic members 24 rebound, driving the first positive electrode members 14, the second positive electrode member 22, and the second negative electrode members 18 to their original positions.

Figure 10:
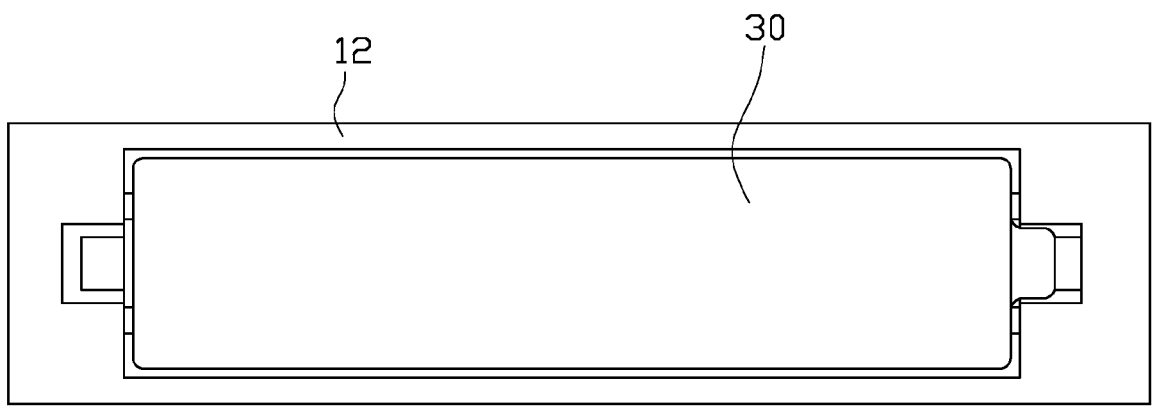
FIG. 10 is similar to FIG. 8, but with the battery reversed.
Figure 11:
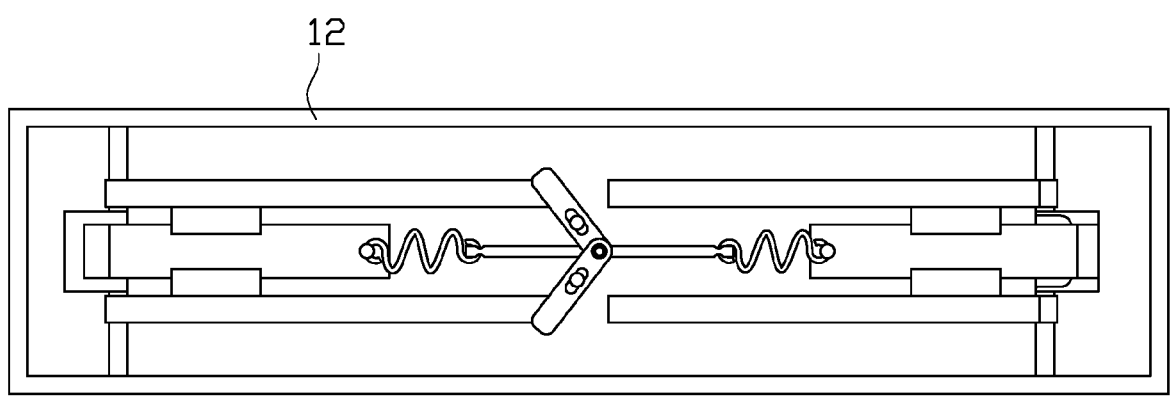
FIG. 11 is similar to FIG. 10, but an inverted view.

Referring to FIGS. 10 and 11, the battery 30 can be reversed then mounted in the battery box.

Moreover, if a plurality of batteries are needed, a larger sized battery box may be provided, and the batteries are series connected between the positive electrode terminal in an end of the receiving space and two negative electrode terminals in an opposite end of the receiving space, or a plurality of the above-mentioned battery boxes each accommodating a battery may be connected together.

Figure 12:
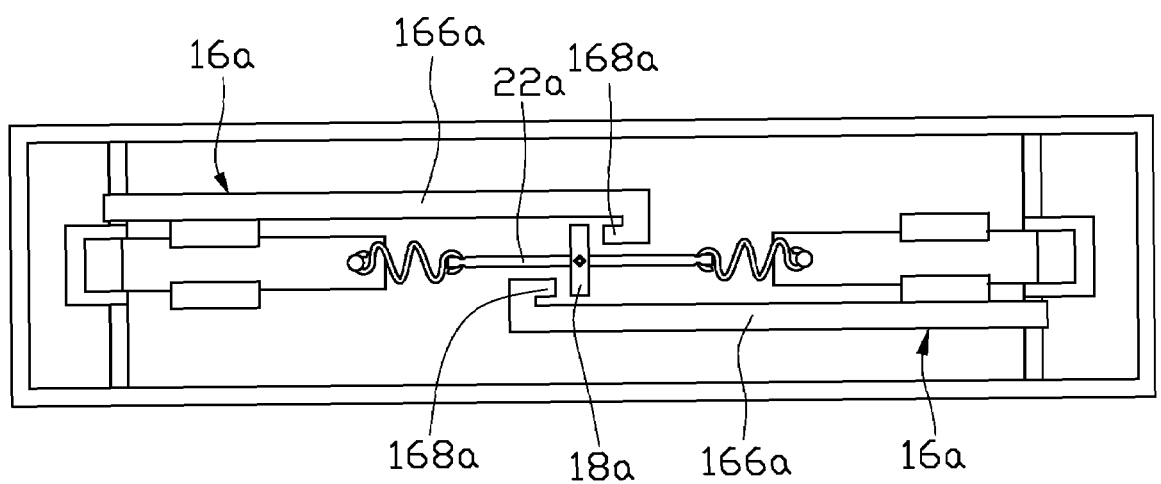
FIG. 12 is an assembled, bottom view of a battery box in accordance with a second preferred embodiment of the present invention.

FIG. 12 shows a battery box in accordance with a second embodiment of the invention. The battery box of this embodiment is similar to the battery box of the above-mentioned embodiment. Differences of the battery box of this embodiment from the above-mentioned embodiment are that the battery box includes two first negative electrode members 16a mounted at opposite ends of a housing thereof, and a second positive electrode member 22a. A mounting portion 166a of each first negative electrode member 16a extends to form an L-shaped extension portion 168a, and the battery box includes a second negative electrode member 18a. The second negative electrode member 18a is perpendicularly mounted to a middle of the second positive electrode member 22a. Two ends of the second negative electrode member 18a correspond to the extension portions 168a of the first negative electrode members 16a, respectively.

In use, the second negative electrode member 18a moves together with the second positive electrode member 22a to touch the extension portion 168a of a corresponding first negative electrode member 16a.

Figure 13:
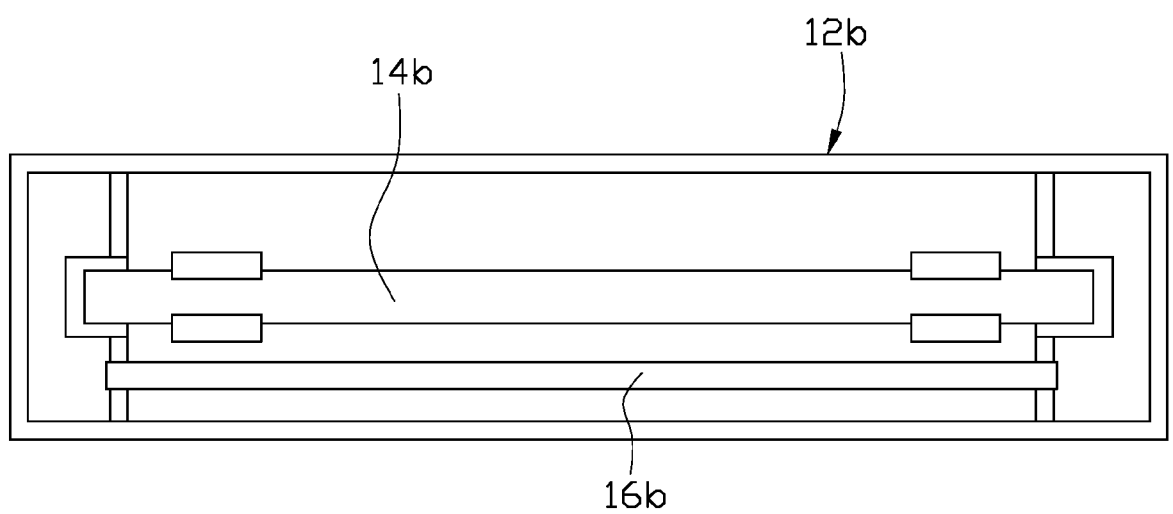
FIG. 13 is an assembled, bottom view of a battery box in accordance with a third preferred embodiment of the present invention, the battery box including a positive electrode member.
Figure 14:
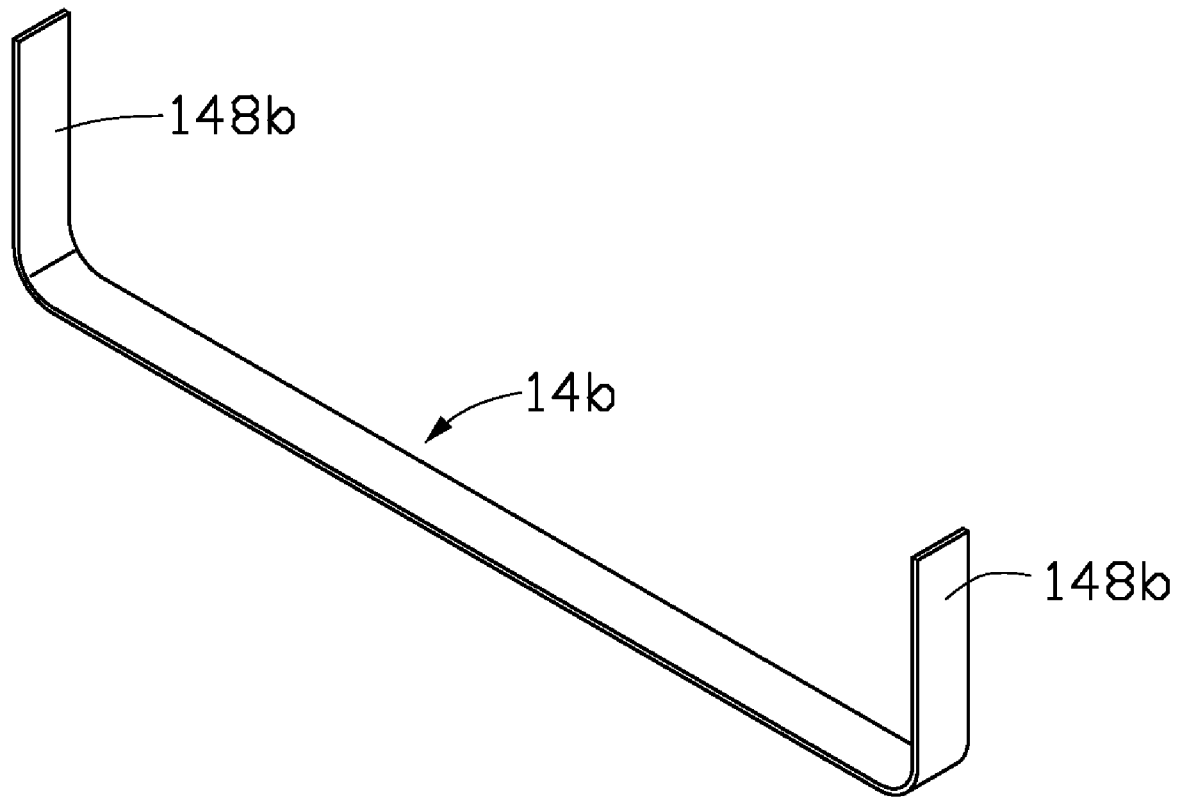
FIG. 14 is an isometric view of the positive electrode member of FIG. 13.

FIGS. 13 and 14 show a battery box in accordance with a third embodiment of the invention. The battery box of this embodiment is similar to the battery boxes of the above-mentioned embodiments. Differences of the battery box of this embodiment from the above-mentioned embodiments are that the battery box includes a housing 12b, a positive electrode member 14b, and a negative electrode member 16b. The positive electrode member 14b includes two positive electrode terminals 148b perpendicularly extending from opposite ends thereof. The negative electrode member 16b includes two negative electrode terminals (not visible) perpendicularly extending from opposite ends thereof. The positive electrode member 14b acts as a positive electrode output member of the battery box. The negative electrode member 16b acts as a negative electrode output member of the battery box. The positive electrode member 14b and the negative electrode member 16b are made of metal tabs.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A battery box, comprising:
 a housing comprising a receiving space in a side thereof for receiving at least one battery therein, and a mounting wall at an opposite side thereof, the receiving space defining two slots at opposite ends thereof;
 two first positive electrode members slidably mounted to opposite ends of the housing respectively, each of the first positive electrode members comprising a sliding portion slidably mounted to the mounting wall of the housing, and a positive electrode terminal extending from the sliding portion and located at a corresponding one of the two slots in the receiving space configured for contacting with a positive electrode of the at least one battery;
 at least two first negative electrode members mounted to opposite ends of the housing respectively, each of the at least two first negative electrode members comprising a mounting portion mounted to the mounting wall of the housing, and a negative electrode terminal located in the receiving space of the housing configured for contacting with a negative electrode of the at least one battery;
 an elastic returning structure elastically and electrically connected between the sliding portions of the first positive electrode members; and at least one second negative electrode member non-electrically mounted to the elastic returning structure, the at least one second negative electrode member moving together with the elastic electric assembly to touch with a corresponding mounting portion of the at least two first negative electrode members when assembling the at least one battery.

2. The battery box as claimed in claim 1, wherein the elastic returning structure comprises a second positive electrode member, and two elastic members, each of the elastic members is electrically connected between a corresponding end of the second positive electrode member and the sliding portion of a corresponding first positive electrode member.

3. The battery box as claimed in claim 2, wherein each of the elastic members is snake-shaped.

4. The battery box as claimed in claim 2, wherein a shaft protrudes from a middle of the second positive electrode member, the at least one second negative electrode member defines a shaft hole therein, for pivotably receiving the shaft of the second positive electrode member.

5. The battery box as claimed in claim 4, wherein at least one post protrudes from a middle of the mounting wall of the housing, the at least one second negative electrode member defines a restricting slot therein, for slidably receiving the at least one post.

6. The battery box as claimed in claim 2, wherein the at least one second negative electrode member comprises a second negative electrode member, the second negative member is perpendicularly mounted to the second positive electrode member.

7. The battery box as claimed in claim 6, wherein the at least two first negative electrode members comprise two first negative electrode members mounted at the opposite ends of the mounting wall of the housing, respectively, a distal end of the mounting portion of each of the first negative electrode members extends to form an L-shaped extension portion configured for contacting with the second negative electrode member when the at least one battery is received into the receiving space.

8. The battery box as claimed in claim 1, wherein two limiting portions extend from each of the ends of the mounting wall of the housing, a sliding rail is defined between the limiting portions slidably receiving the sliding portion of a corresponding first positive electrode member.

9. A battery box assembly comprising:
a housing comprising a receiving space, a pair of rooms formed at opposite ends of the space, and a mounting wall formed between the space and the rooms and separating the space from the rooms, two slots being defined at opposite ends of the mounting wall and communicating the space with the corresponding room;
two first positive electrode members slidably mounted to the opposite ends of the mounting wall respectively, each of the first positive electrode members comprising a sliding portion slidably mounted to an outer surface of the mounting wall opposing the space, and a positive electrode terminal extending from the sliding portion and entering into a corresponding one of the two slots;
two first negative electrode members mounted to the opposite ends of the mounting wall respectively, each of the first negative electrode members comprising a mounting portion mounted to the outer surface of the mounting wall and a negative electrode terminal extending from the mounting portion through the mounting wall into the receiving space;
a second positive electrode member acting as a positive electrode output terminal of the battery box assembly, electrically connected between the first positive electrode members;
a second negative electrode member acting as a negative electrode output terminal of the battery box assembly, insulatively mounted to the second positive electrode member and being movable under driving of the positive electrode output terminal;
at least one battery having a positive electrode and a negative electrode respectively formed at opposite ends thereof, the at least one battery being capable of being received into the receiving space with the positive electrode thereof sliding into any one of the slots and pushing the corresponding positive electrode terminal to cause the second positive electrode member driving the second negative electrode member to contact with the corresponding negative electrode terminal which contacts with the negative electrode of the at least one battery; and
an elastic returning structure configured for returning the second positive and negative electrode members back to their original positions when the at least one battery is removed from the receiving space.

10. The battery box assembly as claimed in claim 9, wherein the second negative electrode member is pivotably mounted to the positive electrode output terminal.

11. The battery box assembly as claimed in claim 10, wherein a post is fixed at the outer surface of the mounting wall, and the second negative electrode member comprises a middle portion defining an elongated slot slidably receiving the post, one end portion being pivotably mounted to the positive electrode output terminal, and an opposite end portion configured for contacting with the corresponding negative electrode terminal.

12. The battery box assembly as claimed in claim 10, wherein the elastic returning structure comprises a spring connected between one of the first positive electrode member and the positive electrode output terminal.

13. The battery box assembly as claimed in claim 10, wherein the elastic returning structure comprises a pair of springs respectively connected between one of the first positive electrode member and the positive electrode output terminal.

14. The battery box assembly as claimed in claim 10, wherein the second negative electrode member is fixed to the positive electrode output terminal, and each of the negative electrode members has an L-shaped distal end extending beyond the negative electrode output terminal.

* * * * *